(No Model.) 3 Sheets—Sheet 1.
J. & C. LANE.
WIRE FENCE MACHINE.
No. 492,214. Patented Feb. 21, 1893.
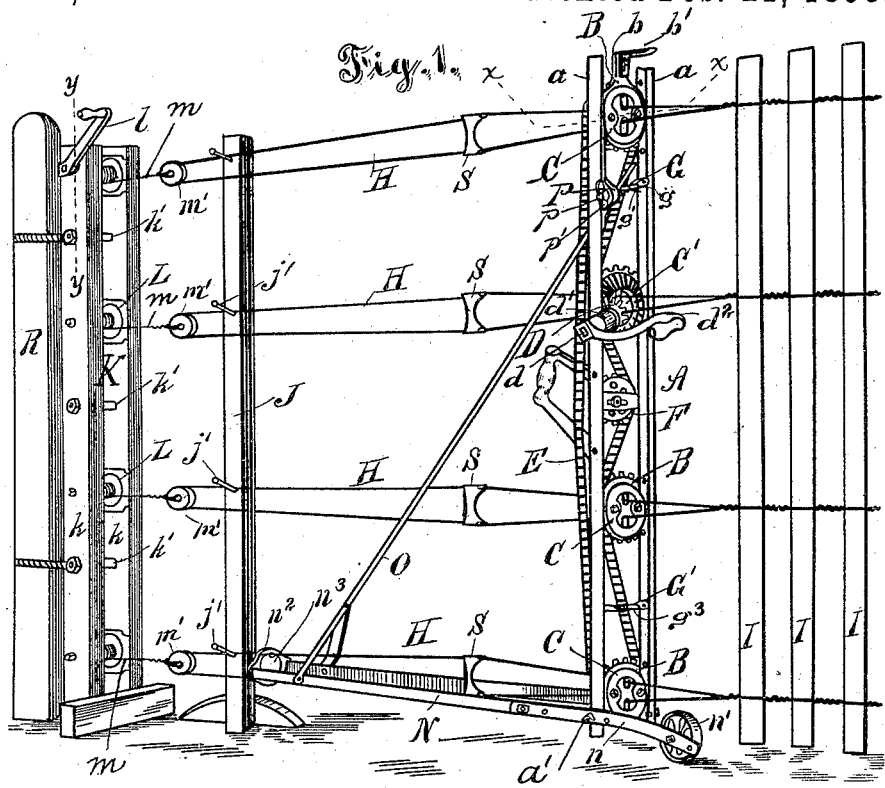
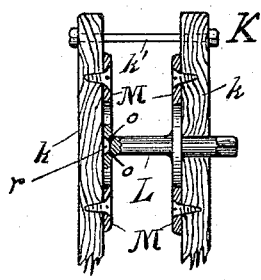
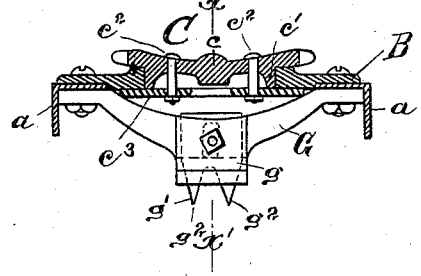
WITNESSES
F. Clough.
J. J. S. Bradford
INVENTORS
John Lane
Cornelius Lane
by Parker & Burton
Attorneys.

(No Model.)  3 Sheets—Sheet 2.
J. & C. LANE.
WIRE FENCE MACHINE.
No. 492,214.  Patented Feb. 21, 1893.
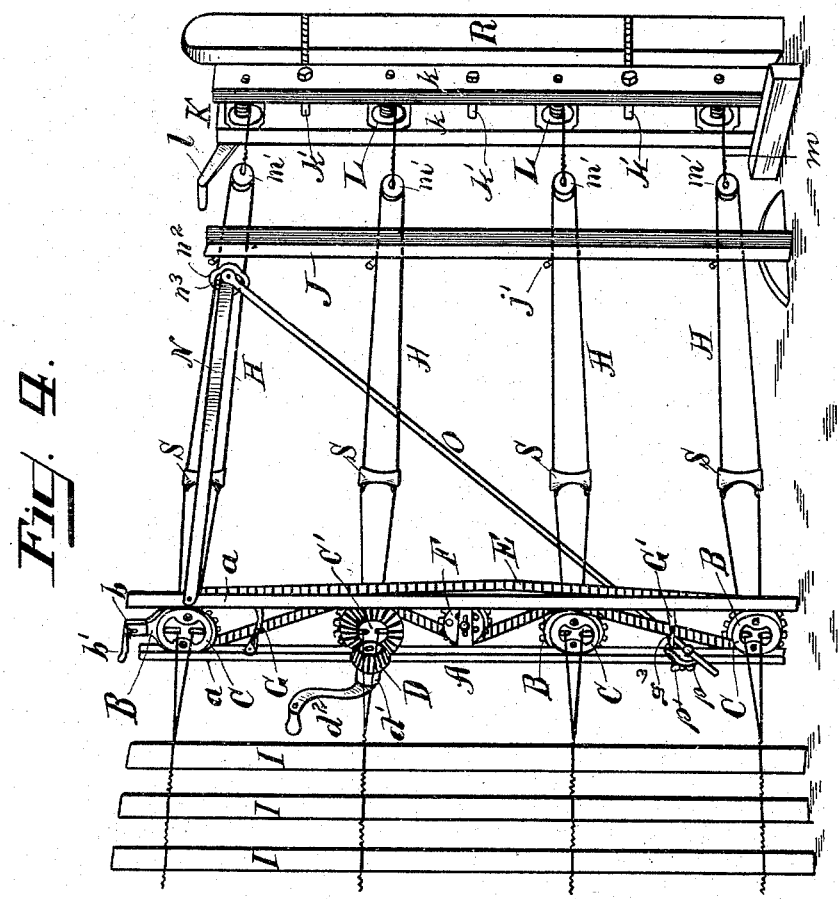

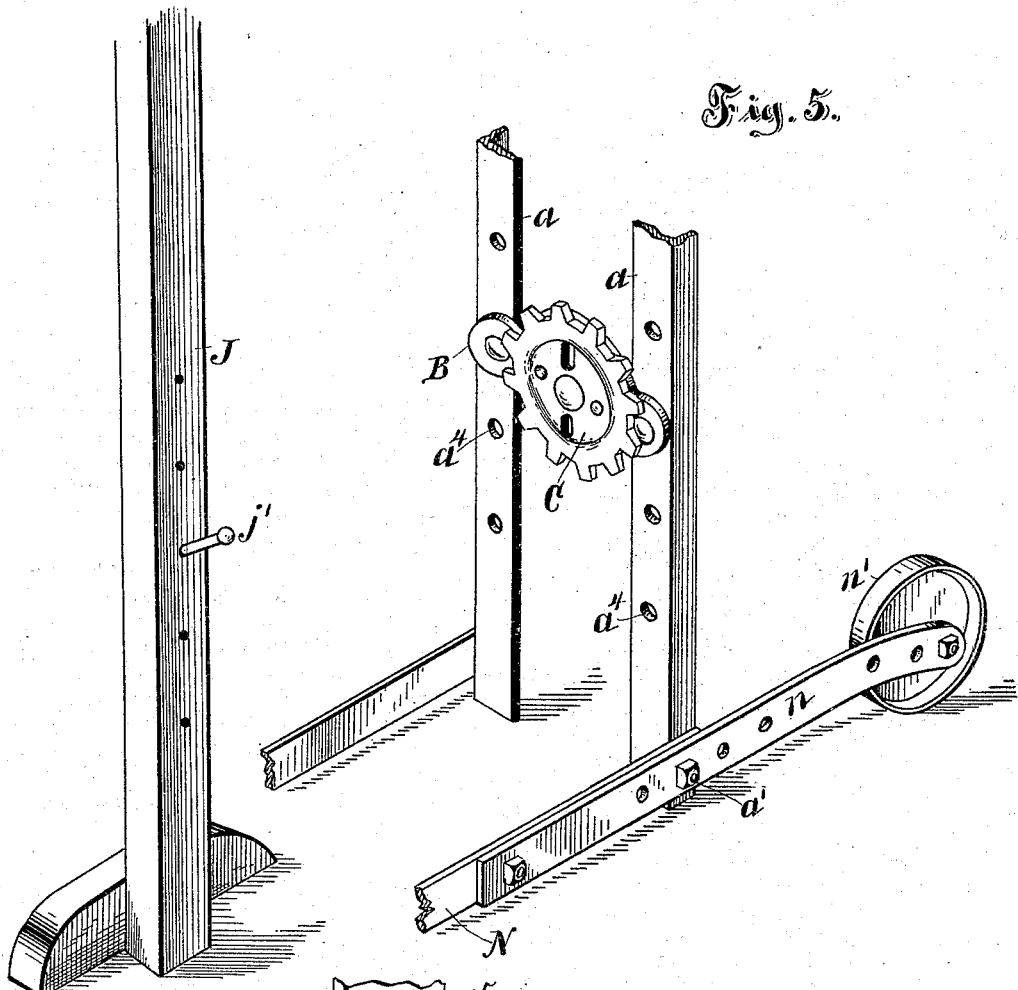

UNITED STATES PATENT OFFICE.

JOHN LANE AND CORNELIUS LANE, OF HOLLY, MICHIGAN.

WIRE-FENCE MACHINE.

SPECIFICATION forming part of Letters Patent No. 492,214, dated February 21, 1893.

Application filed June 20, 1892. Serial No. 437,282. (No model.)

*To all whom it may concern:*

Be it known that we, JOHN LANE and CORNELIUS LANE, citizens of the United States, residing at Holly, county of Oakland, State of Michigan, have invented a certain new and useful Improvement in Wire-Fence Machines; and we declare the following to be a full, clear, and exact description of the invention, such as will enable others skilled in the art to which it pertains to make and use the same, reference being had to the accompanying drawings, which form a part of this specification.

This invention relates to new and useful improvements in fence machines, and consists in a peculiar construction and arrangement of the different parts, all as hereinafter more fully described and claimed, and shown in the accompanying drawings, in which—

Figure 1 is a perspective view of our improved machine as arranged for operation, with the guide arm arranged on the lower strand. Fig. 2 is a transverse section on the line $x-x$ through the upper twister, and also showing in enlarged detail, when looking from above downward, the improved manner of holding the pickets in place preparatory to being fastened by the twisting of the wires as hereinafter described. Fig. 3 is a perpendicular cross section through one of the tension devices on the line $y-y$ of Fig. 1, in showing the manner of engaging the flanges of the spools to form a bearing, as hereinafter described, and also to tighten them therein. Fig. 4 is a perspective view of our machine with the guide arm arranged on the upper strand. Fig. 5 shows an enlarged perspective drawing of the lower twister plate and lower portion of the frame, together with adjustable guide wheel and mode of attachment. Fig. 6 is an enlarged view of a post intended to adjustably support the wires upon pins, one of which is shown in this figure. Fig. 7 is a perpendicular transverse section on the line $x'$,—$x'$, of a portion of Fig. 2, showing the arrangement of the beater plates and toothed plates upon the transverse bar, omitting the twisting mechanism.

A is a frame constructed with vertical sides, $a, a$.

B, B, B, are cross bars firmly attached to the sides of the frame $a, a,$ and which form bearings for the twisters, as more fully illustrated in the cross section of Fig. 2.

C, C, C, are the twisters, which are journaled in the bearings B, and are constructed as shown in Fig. 2, in which $c$ is the twister plate proper having two elongated holes. Upon the inner side of the twister plate is an annular flange $c'$, which fits the bearing of the cross bar, as shown in Fig. 2. Upon the inner side is firmly fastened by means of bolts $c^2, c^2$, the plate $c^3$, having a hole in the center, which plate circumferentially projects beyond the bearing flange $c'$. The conjunction of the plate $c^3$, the bearing flange and the twister plate thus form a groove embracing the cross bar bearing B, Fig. 2.

The twister plates, C, C, C, are constructed with teeth around their circumference, thus becoming practically sprocket wheels.

$C'$ is a twister having the twister plate constructed with a bevel gearing upon its outer face, which engages in a pinion D. This pinion is firmly attached to a shaft $d$, which passes through a bearing $d'$ attached to the side $a$ of the frame. At the outer end of the shaft $d$ is a crank $d^2$, by which the twister $C'$ is thus driven.

Connecting all of the twisters C, C, C, and $C'$, is a sprocket chain E, engaging with the teeth formed upon the twister plates. The sprocket chain is arranged to engage the twisters upon alternately opposite sides, so that the upper and lower sprocket wheels revolve in one direction, while the central ones revolve in the other direction, so that the strands of the upper and lower wires are twisted in the contrary direction to those of the central wires. Intermediately between the central twisters is located a chain tightener, F, which consists of a sprocket wheel merely engaging with the chain, and the axis of which is longitudinally adjustable in a slot. The upper cross bar bearing has projecting upwardly from its upper edge a lug or arm $b$. To this arm is attached by means of a bolt operating in a slot an angular guide $b'$. The upper portion of the guide projects horizontally, and forms the guide for the top end of the picket when placed in position. The slot in the perpendicular portion of the guide $b'$ enables its height to be adjusted, and thereby adjust the tops of the pickets relatively, as will be more fully described in the mode of operation.

At G in Fig. 1, and as shown in Fig. 2, is a connecting bar firmly bolted to each side $a, a$, of the frame A. This is more fully shown in Fig. 2, looking from the top downward and in Fig. 7, which is a perpendicular transverse section of Fig. 2. Attached to the cross-bar G in its center and on its upper side by means of a bolt $g^4$ is an adjustable beater plate $g$. On its under side and attached by means of the same bolt is adjustably fastened a corresponding plate $g'$, except that its outer edge toward the fence is arranged in a series of teeth, of which two are shown at $g^2, g^2$, in Fig. 2. The plates $g$ and $g'$ have longitudinal slots $g^5$ and $g^6$, which are adapted to permit a longitudinal adjustability by loosening the bolt $g^4$. By this means they are capable of being adjusted with reference to the outer face of the bar G relatively to the points $g^2$ of the plate $g'$. At G' is a corresponding cross-bar, as shown in Fig. 1, and which carries an adjustable beater plate $g^3$ in its center, which may be made to correspond with the beater plate $g'$ in the upper cross-bar G. The adjustment of the guide $b'$ and the beater plates $g$ and $g'$ with the projecting teeth $g^2$, and the beater $g^3$, form a means of adjustment for the picket to be operated upon, and also a means of holding it in place until firmly fastened by the twisting of the engaging wires, as hereinafter set forth.

H, H, represent pairs of wires, one of each pair passing through respective elongated holes in the twisters, as shown in Fig. 1.

I, I, represent pickets in place.

J is an attachment consisting of an upright post adapted to rest upon the ground, and carrying adjustably attached thereto pins, $j'$, $j'$, over and upon which a strand of the respective pairs of wires may be placed. This supports the wires from sagging at that particular point.

The tension devices consist of a strong upright frame K, constructed with side pieces $k$, $k$, connected together by bolts $k', k'$. These are shown in cross section in Fig. 3 through $y-y$ of Fig. 1. Fig. 3 also shows the details of the arrangement of the spools and the manner of creating the tension. The tension devices proper, as more particularly illustrated in Fig. 3, consist of a strong iron spool L, one end of which carries a shaft to which it is rigidly attached, and passing through one of the side pieces $k$, and is adapted at its end to receive the handle of a winch $l$. The bearing for the spool L is made by two washers M, M, firmly screwed to the side pieces $k, k$. The orifices in the washers are large enough to embrace the flanges upon the spool, and which thus form the transverse bearing for the spool between the side pieces. This bearing is relatively large as compared with the diameter of the spool itself, as will be seen by Fig. 3. At the end opposite to the shaft in the spool L, there is a concavity $r$. Between the concavity and the outer surface of the spool, and inside of the flange are perforated two holes $o$ opposite to each other, as shown in Fig. 3 in perpendicular section, showing this arrangement of the holes. The object of these holes is to permit the insertion of the ends of the wires, and firmly secure them while they are being wound upon the spool. Each of the spools L, L, is constructed in a similar manner, and the description of one answers for all. As shown in Fig. 1, wires, $m, m$, of any assignable stiffness, are wound upon the spools. The outer ends of these wires are firmly attached to the pulleys $m'$, $m'$, by means of swivels, which, as they are not new and are common, are not shown or described. The frame $k, k$, being held together by bolts $k', k'$, it is obvious that by tightening these bolts a compressive strain will be brought to bear upon the sides of the spools L, L, compressing them between the side pieces $k, k$, and that thereby any assignable degree of frictional resistance can be created. This frictional resistance combined with the stiffness of the tension wires $m, m$, can be made to resist the proper degree of strain which is brought to bear upon the wires H, H, and at the same time automatically yield longitudinally to the shortening of the wires H, H, due to their being twisted and to the clasping of the pickets. In this manner we are enabled to avoid any ratchet mechanism or other analogous device which requires a positive operation to allow the tension wires to yield to a strain and the shortening of the fence wires.

Pivotally attached to the bottom of one side of the frame A at $a'$ in Fig. 1 is a guide arm N. The outer end of this guide arm carries a detachable adjustable extension $n$. The outer end of this extension $n$ carries pivotally attached thereto and adjustable by means of various holes a small wheel $n'$. The opposite ends of the guide are connected by a cross bar $n^2$, the center of which is enlarged, forming a bearing, and within which rotates a washer $n^3$. This washer is perforated, as shown in Fig. 1, and each of the lower pair of fence wires H pass through the respective holes and from thence to the pulley. This permits the wires to turn in the twisting operation, and also permits the guide arm N to freely move longitudinally upon the fence wires. The outer end of the guide arm N is connected by a pivoted brace O to the upper end of the frame A. At the upper end of the frame A is attached a bracket P carrying an eye bolt $p$, which engages the brace O, and through which the brace can freely slide, except as hereinafter stated. The portion of the eye bolt which passes through the bracket is threaded, and a thumb screw, $p'$, provided. By means of this thumb screw, the eye bolt can be drawn up tightly to the bracket, and firmly hold the brace O in any position desired. This arrangement permits the device to be used upon uneven or hilly ground, by elevating or lowering the end of the guide arm to the desired angle of the slope upon which the machine is traveling, and at the same time permits the frame A to remain in a perpendicular position.

In Fig. 4, which is an obverse perspective view of the improved machine, the guide arm is shown attached to the upper end of the frame A by pivoted joints exactly the same as is shown in its attachment to the bottom of the frame in Fig. 1. It also is connected with the upper strands of wires as a rider, exactly as upon the lower strand, as shown in Fig. 1. The adjustable brace O and its bottom connections are the same as shown in Fig. 1, except its position is reversed. In this form, the wheel, $n'$, and adjustable frame carrying it, $n$, are detached, the object of this figure, in comparison with Fig. 1, being to illustrate the reversibility of the guide arm and brace from its connection with the lower strand to that of the upper strand. This reversibility is a desirable feature, and is novel in this machine; the machine as constructed in Fig. 1 is especially adapted to make a low fence with only two or three strands of wire, while that shown in Fig. 4 would enable the operators to build a fence with the upper strands only, as it is sometimes desirable to bar certain classes of stock, as horses and cattle, and at the same time to permit other classes, as sheep and hogs, to pass underneath the fence. Thus, the machine as constructed possesses a greater adaptability to construct all kinds of fence than any other with which we are acquainted.

R is a post or other means of attachment, which is intended to resist the strain of all of the wires. It is obvious that this post may be anchored at any reasonable distance from the frame K, and connected by means of ropes, cords, or wires; or, it may be a convenient tree or any other point of resistance in the line of the fence that is being built.

In the sides $a$, $a$, of the frame A, the cross bar bearings B, B, may be varied as to distance between each other, by raising and lowering them, carrying thereby the twisters C, C, and adjusting the cross bar bearings in holes $a^4$, $a^4$, perforating the sides $a$, $a$, of the frame. By this means the distance between the wires can be changed. As the sprocket chain is constructed with detachable links in the usual form of such chains, it can be lengthened by adding pieces, or shortened by taking out links, to correspond with the change in the wires. In advance of the twisters there are located detached spreaders, S, S, made of one piece, the opposite ends of which are concaved to admit the wires. These spreaders are so located with reference to the twisters, that the line of each wire between the twisting point and the spreader where it passes through the twister is kept practically straight, the spreaders being moved along as successive pickets are attached to the fence, so as to retain substantially relatively a position that will be the apex of the triangular form by the junction of the wire and the spreader as a base, substantially as shown in Fig. 1. The openings in the twisters through which the wires pass are elongated so as to permit a certain amount of outward and inward motion to correspond with the varying position of the wires as the picket is placed in between them, spreading their apex, and on the closure effected by the twisting.

The mode of operation of this device is as follows: First, the original point of attachment of the wires at the beginning of the fence is arranged in the usual manner. The resistance point at the opposite end of the fence is also established, and immediately there is placed the frame K, upon the spools L on which are already wound under strain the tension wires $m$, $m$. To the pulleys carried by these wires are respectively attached the double fence wires H, H; they are prevented from sagging by the location of the post J; any assignable degree of tension is placed upon the wires by means of the pulleys and tension wires, aided by the compression of the spools between the sides of the frame K; the spreaders S, S, are attached, and the wires having first been previously passed through the twisters carried by the frame A, a picket is introduced by placing its upper end against the upper guide plate $b'$, it being held in that position by its impingement upon the teeth $g^2$ and against the lower guide plate $g'$. The guide arm N, by means of the brace O, is adjusted to the angle of the slope upon which the fence is being built. The frame A together with the guide arm N being carried upon the wheel $n'$, is then pushed up, carrying the picket into the angle made by the pairs of wires H, H. The crank $d^2$ is then rotated sufficiently to twist the wires in front of the picket, thus holding it firmly in place. The frame A is then drawn away from the picket a sufficient distance, and another picket is introduced, the upper end against the guide plate $b'$, and being carried by the teeth $g^2$. The frame A with the picket is then pressed up toward its fellow, and the crank $d^2$, operating the twisters by twisting the wires, secures that picket also in position. This operation is repeated indefinitely.

As hereinbefore stated, the shortening of the wires is accommodated by the automatic yielding of the tension arrangement carried by the frame K, and which will need no further description.

It is obvious that the slotted holes in the twisters, in connection with the detached spreaders, permit of much longitudinal movement of the frame A, upon the wheel $n'$, controlled by the adjustable guide arm carried at its end upon the lower strands of wires.

When it is desired to reverse the position of the guide arm, the bolts are detached from the lower end, the wheel and its frame are taken off, and the guide arm is pivotally attached to the upper end of the frame A, and the brace adjustably attached to the lower end of the frame, as shown in Fig. 4. The upper strands of wires are then run through the outer end of the guide arm, the pickets are placed in position in exactly the same manner as they are when the machine is arranged as in Fig. 1, and the operation of fastening the pickets is also the same and therefore needs no further description.

What we claim is—

1. In a carrying frame for two or more wire twisting devices, the combination with the vertical side pieces, of transverse bars carrying adjustable beater plates, and adjustable toothed plates, both adjustably secured to the transverse bar by a single bolt and nut, substantially as described and for the purpose set forth.

2. In a carrying frame for wire twisting devices, the combination of vertical side pieces with the reversible wire riding guide arm constructed of two sides, each of which is pivotally engaged at will to the upper or lower end of the side pieces, an adjustable ground wheel removably secured to the extended end of one side of said guide arm, an adjustable brace engaging the end of said double guide arm and the carrying frame, and a revoluble washer located in the cross piece uniting the wire riding ends of the sides of the guide arm, substantially as described.

3. In a tension device for a fence machine, the combination of a frame, bearings located upon the inside thereof and opposite to each other, a tension spool located upon an axis extending through both of said frames and supported thereby, the flanges of said spool engaging in the bearing plates, and adjustable bolts engaging the frame whereby the frame can be brought to bear upon the end surfaces of the spools, and means for turning said spools, substantially as described.

4. In a tension device for a fence machine, the combination of a frame, bearings located upon the inside thereof and opposite to each other, a tension spool located upon an axis extending through both of said frames and supported thereby, the flanges of said spool engaging in the bearing plates, adjustable bolts engaging the frame whereby the frame can be brought to bear upon the end surfaces of the spools, means for turning said spools, and a tension wire adapted to be connected to the fence wire, substantially as described.

In testimony whereof we sign this specification in the presence of two witnesses.

JOHN LANE.
CORNELIUS LANE.

Witnesses:
EMERSON M. NEWELL,
JOS. SIMONS.